United States Patent
Gilles

[15] 3,669,961
[45] June 13, 1972

[54] PROCESS FOR THE PREPARATION OF HYDROXYBENZYL ESTERS OF CYANURIC ACID

[72] Inventor: Jack C. Gilles, Shaker Heights, Ohio
[73] Assignee: The B. F. Goodrich Company, New York, N.Y.
[22] Filed: May 27, 1969
[21] Appl. No.: 828,376

[52] U.S. Cl............260/248 NS, 260/45.8 N, 260/94.9 GC
[51] Int. Cl. .......................................................C07d 55/38
[58] Field of Search ..............................260/248 NS, 249.6

[56] References Cited

UNITED STATES PATENTS 3,531,483   9/1970   Gilles....................................260/248
2,454,078   11/1948  McGrew...............................260/249.6

OTHER PUBLICATIONS

"Cyanuric Acid," F.M.C. Corporation Product Bulletin 10B, April 1965, New York, pp. 1–7 and 13–22.

Primary Examiner—John M. Ford
Attorney—J. Hughes Powell, Jr. and Ernest K. Bean

[57] ABSTRACT

Hydroxybenzyl-substituted isocyanurates are prepared by the condensation reaction of a phenol with cyanuric acid or a partial ester of cyanuric acid and formaldehyde. The hydroxybenzyl-substituted isocyanurates and particularly 3,5-dialkyl-4-hydroxybenzyl isocyanurates and useful stabilizers for a wide variety of organic materials including olefin homopolymers and copolymers.

20 Claims, No Drawings

3,669,961

PROCESS FOR THE PREPARATION OF HYDROXYBENZYL ESTERS OF CYANURIC ACID

BACKGROUND OF THE INVENTION

Esters of cyanuric acid wherein the ester substituent is an aliphatic hydrocarbon radical are known. These alkyl-substituted isocyanurates have been prepared by reacting alkyl halides and potassium cyanate and other such trimerizations of cyanates and isocyanates; reacting cyanuric acid with an alkyl halide or alkenyl halide in the presence of a basic acceptor; or the reaction of a metal salt of cyanuric acid with an alkyl sulfate or alkyl halide. Processes available for the preparation of aryl-substituted isocyanurates, especially were the aryl substituent contains a functional group such as a hydroxyl group, are even more limited. These processes typically result in poor yields of a low purity product due to the numerous side reactions which occur and require long reaction times and the use of costly starting materials.

SUMMARY OF THE INVENTION

We have now discovered, quite unexpectedly, a process whereby hydroxybenzyl-substituted isocyanurates are obtained in good yield and high purity. The present invention provides a simple and economical process for preparing hydroxybenzyl-substituted isocyanurates by the condensation reaction of a phenol and cyanuric acid or partial ester of cyanuric acid with formaldehyde at an elevated temperature. The reaction is preferably conducted in an organic reaction medium and in the presence of a basic catalyst. The isocyanurate ring may be substituted with one, two or three hydroxybenzyl groups depending on the molar proportion of phenol employed and the number of reaction sites (>N—H) available on the ring. The phenols employed contain one or more alkyl radicals on the aromatic nucleus, and more preferably are 2,6-dialkyl phenols wherein the alkyl groups are tertiary alkyl groups. The process is generally conducted in the temperature range between about 70° and 180° C. Basic materials present in catalytic amounts are useful for the present process and insure high yields in very short reaction times. The preferred basic catalysts are mono- and polyamines, alcoholates and hydroxides.

The hydroxybenzyl-substituted isocyanurates obtained by the present process are useful stabilizers for a wide variety of organic materials. They possess low volatility, are non-staining and are extremely effective protective agents for organic polymeric materials, both natural and synthetic, which are subject to the deleterious effects of oxygen, heat and both visible and ultraviolet light. They are especially useful as stabilizers for α-olefin homopolymers and copolymers, particularly, polyethylene, polypropylene, ethylene-propylene copolymers and ethylene-propylene terpolymers.

DETAILED DESCRIPTION

The present invention is directed to the preparation of hydroxybenzyl-substituted isocyanurates, and more particularly, to a process for the preparation of isocyanurates substituted with one or more hindered phenol groups. The process consists of the condensation of a phenol, cyanuric acid or a partial ester of cyanuric acid and formaldehyde at an elevated temperature. It is particularly useful for the reaction of 2,6-dialkyl phenols, formaldehyde and cyanuric acid to obtain 3,5-dialkyl-4-hydroxybenzyl isocyanurates. When cyanuric acid is employed, the amount of the phenol can be varied so as to vary the degree of substitution on the isocyanurate ring. Reaction of a partial ester of cyanuric acid with phenol and formaldehyde in accordance with the present process will yield a mixed ester of cyanuric acid, that is, isocyanurates containing one or two other substituents besides the hydroxybenzyl group.

Cyanuric acid and partial esters of cyanuric acid corresponding to the structural formula

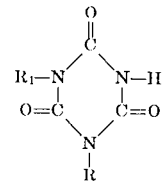

wherein R is a branched or straight chain aliphatic hydrocarbon radical containing from one to 20 carbon atoms and $R_1$ is hydrogen or a branched or straight chain aliphatic hydrocarbon radical containing from one to 20 carbon atoms, are employed for the process. Especially useful partial esters are those containing one or two alkyl groups containing from six to 78 carbon atoms such as hexyl, 2-ethylhexyl, octyl, decyl, lauryl, palmityl and stearyl. For the process it is essential when a cyanuric acid ester (isocyanurate) is to be reacted that there be at least one >N—H grouping available on the ring to provide the necessary reaction site for the condensation with the phenol and formaldehyde. Although it is not essential that all three nitrogen atoms of the cyanuric acid ring have available hydrogen, excellent results have been obtained where cyanuric acid is employed to give tris(4-hydroxybenzyl)isocyanurates. Other structurally related heterocyclic compounds, that is, those having a

molecular grouping in the ring, can similarly be reacted with phenol and formaldehyde to achieve hydroxybenzyl substitution in accordance with the present invention. Such compounds include: uric acid, hydantoin, allantoin, parabanic acid, alloxan, uracil, thymine, barbituric acid, phenobarbitone and the like.

Reacted with the cyanuric acid or partial ester of cyanuric acid is a phenol, or mixture of phenols, corresponding to the formula

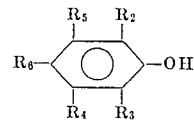

wherein $R_2$ is an alkyl group, either aliphatic or cycloaliphatic, containing from one to 18 carbon atoms and $R_3$, $R_4$, $R_5$ and $R_6$ are hydrogen or an alkyl group, either aliphatic or cycloaliphatic containing from one to 18 carbon atoms but at least one of the $R_3$, $R_4$, $R_5$ or $R_6$ groups is a hydrogen. More preferably the phenol is a 2,6-dialkyl phenol where $R_2$ and $R_3$ are alkyl groups containing from one to 12 carbon atoms and $R_6$ is hydrogen. Excellent results have been obtained when $R_2$ and $R_3$ are tertiary alkyl groups containing from four to eight carbon atoms and $R_4$, $R_5$ and $R_6$ are hydrogen. Illustrative of the alkyl groups which may be substituted on the phenol ring are methyl, ethyl, n-propyl, isopropyl, butyl, hexyl, cyclohexyl, methylcyclohexyl, 2-ethylhexyl, octyl, lauryl, and the like. Exemplary tertiary alkyl groups are t-butyl, t-amyl, 1-methyl-1-ethylpropyl, 1,1-diethylbutyl, 1,1,2,2-tetramethylpropyl, 1,1-dimethylpentyl, 1,1,2-trimethylpentyl and the like.

In addition to the phenol and the cyanuric acid or partial ester thereof, formaldehyde is employed in the present process. Any reagent which will serve as a source of formaldehyde such as formalin solutions, paraformaldehyde and trioxane are suitable for the process and when the term formaldehyde appears subsequently in the specification and claims it is intended to include formalin, paraformaldehyde, trioxane and all other formaldehyde-liberating compounds.

Excellent results have been obtained when the source of formaldehyde is paraformaldehyde, typically having up to about 100 or more formaldehyde units polymerized together. These materials are readily depolymerized under the reaction conditions employed and serve as a convenient and economical source of formaldehyde.

The reaction may be conducted with or without a catalyst. If a catalyst is employed, organic and inorganic basic materials such as primary, secondary and tertiary monoamines and polyamines, alkali metal alcoholates, alkali metal hydroxides, quaternary ammonium hydroxides and the like, will be used. The usual basic catalysts include diethylamine, tributylamine, ethylenediamine, tetramethylenediamine, hexamethylenetetraamine, sodium ethoxide, potassium ethoxide, potassium t-butoxide, sodium hydroxide, potassium hydroxide, ammonium hydroxide, tetramethylammonium hydroxide, trimethylbenzylammonium hydroxide, tricaprylylmethylammonium hydroxide and the like. Excellent results have been obtained when polyamines, preferably having a polycyclic structure such as hexamethylenetetraamine, are employed. The amount of catalyst used can range up to about 0.1 mol per mol cyanuric acid or partial ester thereof and more preferably will be between about 0.0001 and 0.02 mol per mol cyanuric acid.

The reaction can be conducted in an organic diluent which may also serve as a solvent for the cyanuric acid or partial ester and/or the phenol. The reaction product may also be soluble in the organic reaction medium or it may be advantageous to the recovery that the product be insoluble or have limited solubility. Besides solvent capacity another criterion for choosing the organic reaction diluent is the boiling point of the material. The boiling point of the diluent will usually be high enough to permit reaction within the preferred temperature range, that is, above about 70° C. Excellent results can be obtained, however, with diluents which have boiling points as low as 50° C. if the reaction is conducted in a pressure vessel. In some instances it may even be advantageous to employ low boiling diluents to facilitate recovery of the reaction product by steam stripping or the like. Especially useful diluents for the present process include amides such as formamide and acetamide, N-alkyl-substituted amides such as N-ethylformamide, N,N-dimethylformamide, N,N-diethylformamide, N,N-dimethylacetamide and the like; dimethyl sulfoxide; acetonitrile; propylene carbonate; N-methyl-2-pyrrolidone and the like. In general, organic solvents having solubility parameters ($\delta$) above about 10 as defined in Interchemical Review, 14, 3–16, 31–46 (1955) are useful diluents for the present process.

It is not necessary that the reaction be conducted under anhydrous conditions. Water may be present in the reaction medium without interfering with the yield of the product obtained and the product purity. Due to the ready solubility of formaldehyde in water, an amount of water will even be advantageous to maintain the formaldehyde in the reaction system. Other advantages may also be realized due to the presence of water in the reaction system. For example, if sufficient water is present the product, immediately upon formation, will precipitate from solution leaving only the reactants. Such precipitation of the product is advantageous in a continuous system for continuous removal of the reaction product from the reaction zone. Excellent yields of high purity product have been obtained when the reaction medium contains up to 40% by weight water, however, best results are obtained when less than about 25% by weight water is employed.

It is usual to conduct the reaction at a temperature greater than about 70° C. When temperatures below about 50° C. are employed the reaction rate drops off markedly and lower yields of the product are obtained. Temperatures up to about 180° C. may be employed, however, best results are obtained in the temperature range between about 90° and 150° C. The reaction will be conducted at atmospheric, sub-atmospheric or super-atmospheric pressures depending on the reaction temperature and the particular reaction medium employed.

When low-boiling diluents are used closed reactors are employed and operating pressures up to about 100 psig will typically be developed. The reaction can be conducted at pressures up to about 500 psig with no adverse results.

Although the process is readily carried out by combining the individual reactants in the manner and proportions described above, alternative techniques may also be employed to give similar results. For example, formaldehyde hydrate may be formed and reacted with the phenol and cyanuric acid or ester of cyanuric acid or the methylol derivative of cyanuric acid or partial ester of cyanuric acid can be pre-formed and subsequently reacted with the phenol to give the hydroxybenzyl-substituted isocyanurates. Such a process as the latter may be desirable and facilitate conducting the process on a continuous basis since the methylol derivative could be formed first and then in a subsequent stage react with the phenol.

For the success of the present process all that is required is that the reactants be present within the defined molar quantities to achieve the desired degree of substitution and that the reaction be conducted in accordance with the above-described reaction conditions. The molar ratio of the reactants employed will vary depending on the number of available reaction sites (>N—H), that is, whether cyanuric acid or a partial ester of cyanuric acid is employed, and the degree of reaction desired. For example, if cyanuric acid is employed 3 mols of the phenol will be reacted per mol of the cyanuric acid for complete reaction to give the tris(hydroxybenzyl)isocyanurate. With a partial ester of cyanuric acid containing two reactive >N—H sites, such as hexylisocyanurate, 2 mols of the phenol will be reacted. If all the sites are to be reacted a molar excess of the phenol may be used to insure completeness of the reaction. The use of excess phenol will also compensate for impurities which may be present in the reaction system and also insure a rapid reaction rate. In general, no particular advantage is realized when more than about 20% excess of the phenol is present. Excellent results have been obtained when 5% molar excess of the phenol is employed. Where less than complete substitution of the cyanuric acid or partial ester is required, the molar amount of phenol will be decreased accordingly from the optimum level employed to react one phenol group per >N—H group. For example, if hexylisocyanurate is to be reacted and it is desired that only one hydroxybenzyl group be substituted thereon, one mol of the phenol is employed per mol hexyl isocyanurate.

Just as with the phenol, the amount of formaldehyde required for the reaction is dependent on the number of available >N—H reaction sites and the degree of substitution desired. Equimolar amounts of the phenol and formaldehyde or a slight molar excess of formaldehyde, up to about 20%, based on the phenol will generally be used. With 5 to 10% molar excess of the formaldehyde based on the phenol, excellent yields of high purity hydroxybenzyl-substituted isocyanurates are obtained.

The following examples will illustrate the invention more fully, however, they are not intended as a limitation on the scope thereof. All parts and percentages in the examples are given on a weight basis unless otherwise indicated.

Various terms used throughout the Examples have been abbreviated for convenience. These are as follows:
2,6-DTBP = 2,6-Di-tertiary-butylphenol
CA = Cyanuric acid
HMTA = Hexamethylenetetraamine
DMF = N,N-dimethylformamide

EXAMPLE I

A reactor thoroughly purged with nitrogen was charged with 32.25 grams (0.25 mol) CA, 162.2 grams (0.5 mol) 2,6-DTBP, 24.8 grams (0.75 mol) paraformaldehyde and a solution of 200 mls DMF and 20 mls water. The reactor and its contents were stirred and approximately 1 gram HMTA added thereto. The reactor mixture was heated to about 112° C. for 5 hours while continuing the agitation. The reaction mixture was then allowed to cool to room temperature and 100 mls methanol added. The resulting product was washed with about 500 mls 90% aqueous methanol on a filter and dried. 152 Grams of a white crystalline material (78.6% yield) was recovered. The solid material had a melting point in the range 219°–220.5° C. and was identified as tris(3,5-di-t-butyl-4-hydroxybenzyl)isocyanurate. Infrared analysis of the product showed the absence of any >N—H groupings. Elemental analysis for carbon, hydrogen and nitrogen also confirmed the product as tris(3,5-di-t-butyl-4-hydroxybenzyl)isocyanurate.

EXAMPLE II

Employing a procedure similar to that described in Example I, tris(3,5-di-t-butyl-4-hydroxybenzyl)isocyanurate was prepared employing dimethyl sulfoxide as the reaction medium. The reactor was charged with 32.25 grams CA, 154.5 grams 2,6-DTBP, 23.6 grams paraformaldehyde, 200 mls. dimethyl sulfoxide, 20 mls water and 1 gram HMTA. The reaction mixture was heated for 21 hours. The recovered product had a melt point of 220.5°–223° C. A 75% yield of the tris(3,5-di-t-butyl-4-hydroxybenzyl)isocyanurate was obtained.

EXAMPLE III

To a reactor containing 200 mls N-methyl pyrrolidone, 10 mls water and 127.6 grams 2,6-DTBP was added 18.6 grams paraformaldehyde, 25.8 grams CA and about 1 gram HMTA. The reaction mixture was heated for three hours at a maximum temperature of 110° C. The reaction product had a melt point of 215°–218° C. in the crude state. The yield of crude tris(3,5-di-t-butyl-4-hydroxybenzyl)isocyanurate was 80%.

EXAMPLE IV

A pressure reactor thoroughly purged with nitrogen was charged 256.8 grams 2,6-DTBP, 443 grams acetonitrile and 97.2 grams water (18% water). Agitation was commenced at about 75 rpm with a continuous nitrogen purge and 40.6 grams paraformaldehyde and 51.85 grams CA charged to the reactor. After the addition of 1.65 grams HMTA catalyst the nitrogen purge was terminated and the reactor sealed. Agitation was then increased and the reaction mixture heated to about 115° C. The temperature was maintained for about 6 hours during which time the pressure within the reactor reached about 40 psig. The reactor was then cooled to room temperature and the contents transferred onto a filter. After washing the material was dried and had a melt point in the range 216°–221° C. A 93.9% yield of tris(3,5-di-t-butyl-4-hydroxybenzyl)-isocyanurate was obtained.

EXAMPLE V

To demonstrate the ability of the present process to be conducted employing other basic catalysts a series of runs were made wherein different basic compounds were employed to catalyze the reaction as well as a run employing no catalyst. The procedure employed was similar to that described in Example I. The amounts of reactants, reaction conditions, and type and amount of catalyst are set forth below in Table I. In all the runs, yields above about 50% were obtained. Even with no catalyst a 71% yield tris(3,5-di-t-butyl-4-hydroxybenzyl)isocyanurate was obtained. All products were obtained in reasonably pure form after washing and/or recrystallization.

EXAMPLE VI

To demonstrate the ability to prepare tris(3,5-di-t-butyl-4-hydroxybenzyl)isocyanurate by the base catalyzed reaction of the trimethylol derivative of CA with 2,6-DTBP, 12.9 grams (0.1 mol) CA, 200 mls DMF and 25 grams of 36% formalin solution (0.3 mol formaldehyde) were charged to a reactor. The reaction mixture was heated to 105° C. for 2 hours and the trimethylol precursor formed. The resulting methylol derivative had the formula

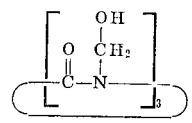

and a portion was recovered as a glassy solid. 2,6-DTBP (63 grams; 0.31 mol) and about 1 gram tricaprylyl methyl ammonium hydroxide were then charged to the reactor and the reaction continued for approximately 10 hours. The crude tris-(3,5-di-t-butyl-4-hydroxybenzyl)isocyanurate was recovered as a white crystalline solid melting at 207°–210° C. After purification the product was comparable in all respects to the isocyanurate obtained by the previous procedures.

EXAMPLE VII

CA was mono-substituted with a hindered phenol group by reacting 12.9 grams CA, 20.8 grams 2,6-DTBP and 3.5 grams paraformaldehyde in 200 mls DMF containing 10 mls water in the presence of HMTA catalyst. The reaction was conducted at about 110° C. for 2 hours. The resulting 3,5-di-t-butyl-4-hydroxybenzyl isocyanurate, after washing with hexane and multiple recrystallization, had a sharp melt point.

EXAMPLE VIII

CA substituted with two hindered phenol groups was prepared by reacting 32.25 grams CA, 103 grams 2,6-DTBP and 15.8 grams paraformaldehyde at about 112° C. Approximately 0.5 gram HMTA catalyst was employed and the reaction media was 10% aqueous DMF. The bis(3,5-di-t-butyl-4-hydroxybenzyl) isocyanurate was recrystallized from aqueous ethanol and melted between about 250°–258° C.

EXAMPLE IX

A mixed ester of CA was obtained by reacting hexyl isocyanurate with 2,6-DTBP. 9.9 Grams hexyl isocyanurate (0.0465 mol), 19.2 grams 2,6-DTBP (0.093 mol), and 2.8 grams paraformaldehyde (0.093 mol) were reacted in about 100 mls 10% aqueous DMF with HMTA catalyst. The reaction was run for 7 hours between 100°–110° C. Recrystallization from aqueous ethanol gave the mixed ester which melted at 110°–116° C.

EXAMPLE X

Following the procedure of Example VI tris(3-methyl-5-t-butyl-4-hydroxybenzyl)isocyanurate was prepared. The trimethylol derivative of CA was first obtained by reacting 12.9 grams (0.1 mol) CA and 24.9 grams (0.3 mol) 36% formalin solution. The resulting trimethylol derivative was then reacted in the presence of HMTA catalyst with 61.5 grams (0.373 mol) 6-t-butyl-o-cresol. About 50 grams of the tris(3-methyl-5-t-butyl-4-hydroxybenzyl)isocyanurate melting between 148°–150° C. was recovered.

TABLE I

| Run | CA (grams) | 2,6-DTBP (grams) | Paraformaldehyde (grams) | DMF/water (mls.) | Catalyst | Reaction temp. (° C.) |
|---|---|---|---|---|---|---|
| 1 | 32.3 | 157.6 | 24.8 | 200/20 | None | 112–117 |
| 2 | 32.25 | 157.6 | 24.8 | 200/20 | Tributylamine (1 gram) | 113 |
| 3 | 12.9 | 61.8 | 10 | 200/15 | Tetramethylammonium hydroxide (1 gram) | 115 |
| 4 | 32.25 | 154.5 | 23.6 | 200/20 | Sodium hydroxide (0.5 gram) | 113 |
| 5 | 32.25 | 154.5 | 23.6 | 200/20 | Potassium t-butoxide (1 gram) | 100–113 |
| 6 | 32.3 | 157.6 | 24.8 | 200/20 | Triethylenediamine (0.5 gram) | 115 |

Similarly, when 49.5 grams 6-t-butyl-m-cresol was employed in the above reaction tris(2-methyl-5t-butyl-4-hydroxybenzyl)isocyanurate was obtained in good yield.

EXAMPLE XI

Thirty-two grams CA, 158 grams 2,6-di-sec-butyl phenol and 24.8 grams paraformaldehyde were reacted in 220 ml aqueous DMF at about 113° C. to give tris(3,5-di-sec-butyl-4-hydroxybenzyl)isocyanurate. When 2,6-dimethyl phenol was substituted in the above reaction, approximately 57% yield tris(3,5-dimethyl-4-hydroxybenzyl) isocyanurate melting between 245°–252° C. was obtained. When a mixture of 2,6-di-t-butyl phenol and 2-t-butyl-o-cresol was employed, a mixed ester of CA was obtained.

The hydroxybenzyl-substituted isocyanurates obtained by the present process are useful stabilizers for a wide variety of organic materials. They are non-staining, possess low volatility and are extremely effective protective agents when incorporated in organic polymeric materials. They are effective for the protection of both natural and synthetic organic polymeric materials which are subject to oxidative, thermal and light-induced degradation. They are useful as stabilizers for α-olefin homopolymers and copolymers and particularly useful with polyethylene, polypropylene and ethylenepropylene copolymers and terpolymers.

To demonstrate the effectiveness as stabilizers in α-olefin polymers, 0.5 part tris(3,5-di-t-butyl-4-hydroxybenzyl)isocyanurate as prepared above was dissolved in acetone and incorporated in 100 parts high-density polyethylene by suspending the polyethylene in the acetone solution and then removing the solvent with a rotary evaporator. The stabilized polyethylene was hot milled at 290°–300° F. for 5 minutes and molded into 10 mil sheets at 300° F. The stabilized sample was subjected to an oxygen atmosphere at 140° C. and found to have an induction period of about 35 hours as compared to an unstabilized high-density polyethylene sample whose induction period was only 0.5 hour. When bis(3,5-di-t-butyl-4-hydroxybenzyl)hexyl isocyanurate was similarly incorporated in high-density polyethylene markedly increased stability was obtained. For example, a polyethylene sample stabilized with 0.1 part of the bis(3,5-di-t-butyl-4-hydroxybenzyl)hexyl isocyanurate had an induction period of about 52 hours. When 0.2 part β-dilauryldithiodipropionate was employed with the bis-(3,5-di-t-butyl-4-hydroxybenzyl)hexyl isocyanurate the induction period was increased to 115 hours.

I claim:

1. A process for the preparation of hydroxybenzyl-substituted isocyanurates which comprises heating together at a temperature from about 70° to 180° C. (1) a phenol or mixture of phenols having the formula

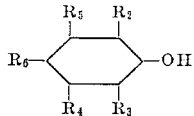

wherein $R_2$ is an alkyl group containing from one to 18 carbon atoms and $R_3$, $R_4$, $R_5$ and $R_6$ are hydrogen or alkyl groups containing from one to 18 carbon atoms, but at least one of the $R_3$, $R_4$, $R_5$ or $R_6$ groups is hydrogen; and (2) an organic heterocyclic compound selected from the group consisting of cyanuric acid and partial esters of cyanuric acid having the formula

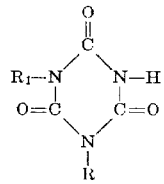

wherein R is an alkyl radical containing from one to 20 carbon atoms and $R_1$ is hydrogen or an alkyl radical containing from one to 20 carbon atoms and a formaldehyde-liberating compound in an organic diluent having a solubility parameter above about 10 and containing up to about 40% by weight of water.

2. The process of claim 1 wherein the reaction is conducted in the presence of an organic or inorganic basic compound as a catalyst.

3. The process of claim 2 wherein (1) is a 2,6-dialkyl phenol wherein $R_2$ and $R_3$ are alkyl groups containing from one to 12 carbon atoms and $R_6$ is hydrogen.

4. The process of claim 3 wherein the organic or inorganic basic compound is selected from the group consisting of primary, secondary and tertiary monoamines, primary, secondary and tertiary polyamines, alkali metal alcoholates, alkali metal hydroxides and quaternary ammonium hydroxides and the reaction temperature is between about 90° and 150° C.

5. The process of claim 4 wherein (1) is a 2,6-di-t-alkyl phenol wherein $R_2$ and $R_3$ are tertiary alkyl groups containing from four to eight carbon atoms and $R_4$, $R_5$ and $R_6$ are hydrogen.

6. The process of claim 5 wherein the formaldehyde-liberating compound is selected from the group consisting of formalin, paraformaldehyde and trioxane.

7. The process of claim 6 wherein the organic diluent is selected from the group consisting of amides, N-alkyl-substituted amides, dimethyl sulfoxide, acetonitrile, propylene carbonate and N-methyl-2-pyrrolidone.

8. The process of claim 7 wherein the organic heterocyclic compound is cyanuric acid, (1) is 2,6-di-t-butyl phenol, the formaldehyde-liberating compound is paraformaldehyde and the basic compound is a polyamine containing up to about 10 carbon atoms.

9. The process of claim 8 wherein the organic diluent is acetonitrile containing up to about 25% by weight water and the basic compound is hexamethylenetetraamine.

10. The process of claim 8 wherein the organic diluent is N,N-dimethylformamide containing up to about 25% by weight water and the basic compound is hexamethylenetetraamine.

11. The process of claim 6 wherein the organic heterocyclic compound is a partial ester of cyanuric acid wherein R is an alkyl group containing from six to 18 carbon atoms, (1) is 2,6-di-t-butyl phenol, the formaldehyde-liberating compound is paraformaldehyde and the basic compound is a polyamine containing up to about 10 carbon atoms.

12. The process of claim 11 wherein the organic diluent contains up to about 25% by weight water and is selected from the group consisting of amides, N-alkyl-substituted amides, dimethyl sulfoxide, acetonitrile, propylene carbonate and N-methyl-2-pyrrolidone and the basic compound is hexamethylenetetraamine.

13. The process of claim 7 wherein the organic diluent contains up to about 25% by weight water and is selected from the group consisting of amides, N-alkyl-substituted amides, dimethyl sulfoxide, acetonitrile, propylene carbonate, and N-methyl-2-pyrrolidone and the reaction temperature is between about 90° and 150° C.

14. The process of claim 13 wherein the methylol derivative of cyanuric acid and 2,6-di-t-butyl phenol are employed.

15. The process of claim 14 wherein the basic compound is a polyamine containing up to about 10 carbon atoms.

16. The process of claim 13 wherein the methylol derivative of a partial ester of cyanuric acid wherein R is an alkyl radical containing from six to 18 carbon atoms and 2,6-di-t-butyl phenol are employed.

17. The process of claim 16 wherein the basic compound is a polyamine containing up to about 10 carbon atoms.

18. The process of claim 3 wherein the organic diluent is acetonitrile containing up to about 25% by weight water.

19. The process of claim 18 wherein (1) is 2,6-di-t-butyl phenol, the organic heterocyclic compound is cyanuric acid, the formaldehyde-liberating compound is paraformaldehyde and the basic compound is hexamethylenetetraamine.

20. The process of claim 18 wherein (1) is 2,6-di-t-butyl phenol, the organic heterocyclic compound is a partial ester of cyanuric acid wherein R is an alkyl radical containing from six to 18 carbon atoms and $R_1$ is hydrogen, the formaldehyde-liberating compound is paraformaldehyde and the basic compound is hexamethylenetetraamine.

* * * * *